United States Patent
Allen, III et al.

(10) Patent No.: US 12,233,528 B2
(45) Date of Patent: Feb. 25, 2025

(54) INDEXED COLLAR CLAMPS FOR TELESCOPING STAND

(71) Applicant: Feedback Sports LLC, Golden, CO (US)

(72) Inventors: William E. Allen, III, Golden, CO (US); Dominic Lovely, Denver, CO (US)

(73) Assignee: Feedback Sports LLC, Golden, CO (US)

( * ) Notice: Subject to any disclaimer, the term of this patent is extended or adjusted under 35 U.S.C. 154(b) by 0 days.

(21) Appl. No.: 18/351,386

(22) Filed: Jul. 12, 2023

(65) Prior Publication Data

US 2024/0019076 A1    Jan. 18, 2024

Related U.S. Application Data

(60) Provisional application No. 63/368,226, filed on Jul. 12, 2022.

(51) Int. Cl.
  *F16M 13/00*    (2006.01)
  *B25H 1/00*    (2006.01)
  *F16M 11/24*    (2006.01)
  *F16M 11/28*    (2006.01)

(52) U.S. Cl.
  CPC ......... *B25H 1/0014* (2013.01); *F16M 11/245* (2013.01); *F16M 11/28* (2013.01); *F16M 2200/027* (2013.01)

(58) Field of Classification Search
  CPC .... B25H 1/0014; F16M 11/245; F16M 11/28; F16M 2200/027
  See application file for complete search history.

(56) References Cited

U.S. PATENT DOCUMENTS

| 594,627 A | 11/1897 | Hewlett et al. |
| 605,429 A | 6/1898 | Howard |
| 653,519 A | 7/1900 | Masters |

(Continued)

FOREIGN PATENT DOCUMENTS

| CN | 203887830 U | 10/2014 |
| CN | 111251261 A | 6/2020 |

(Continued)

OTHER PUBLICATIONS

"International Search Report and Written Opinion issued in PCT Application No. PCT/US2023/070076", Jan. 26, 2024, 19-pages.

*Primary Examiner* — Amy J. Sterling
(74) *Attorney, Agent, or Firm* — Holzer Patel Drennan

(57) ABSTRACT

Indexed collar clamps allow for fast and easy adjustment of an associated telescoping stand, while preventing various underlying components from becoming dislodged from their respective positions over time. A telescoping stand may include an inner tube and an outer tube partially overlapping the inner tube. An overlapping end of the outer tube includes a compliance cut. A bushing is positioned between the inner tube and the outer tube and adjacent the compliance cut. The bushing includes a protrusion that indexes the bushing to an aperture in the outer tube. An indexed collar clamp is positioned over the outer tube and also adjacent the compliance cut. The protrusion from the bushing further indexes the bushing to a slot in the indexed collar clamp.

18 Claims, 8 Drawing Sheets

(56) References Cited

U.S. PATENT DOCUMENTS

| | | | |
|---|---|---|---|
| 3,393,649 A | 7/1968 | Norbert | |
| 3,514,091 A | 5/1970 | Johnson et al. | |
| 3,934,436 A | 1/1976 | Candlin et al. | |
| 3,981,491 A | 9/1976 | Snyder | |
| 4,253,648 A | 3/1981 | Meeks | |
| 4,747,569 A | 5/1988 | Hoshino | |
| 5,169,210 A | 12/1992 | Fricano | |
| 5,277,346 A | 1/1994 | Stier | |
| D356,901 S | 4/1995 | Schoenig et al. | |
| 5,996,814 A | 12/1999 | Workman et al. | |
| 6,142,699 A * | 11/2000 | Pao | F16B 7/1454 403/109.5 |
| 6,494,445 B1 | 12/2002 | Bellis | |
| 7,712,614 B2 | 5/2010 | Carlson et al. | |
| 8,075,217 B2 * | 12/2011 | Eason | G10D 13/02 403/341 |
| 8,496,018 B2 * | 7/2013 | Lenhart | A63C 11/221 280/823 |
| 8,893,897 B2 | 11/2014 | Workman et al. | |
| 9,208,761 B2 | 12/2015 | Miyajima | |
| 9,482,254 B2 * | 11/2016 | Lai | F16B 7/1418 |
| 10,051,930 B2 * | 8/2018 | Heim | A45B 9/00 |
| 11,084,162 B1 | 8/2021 | Liu | |
| 11,371,648 B1 | 6/2022 | Liao | |
| 12,140,177 B2 * | 11/2024 | Huang | F16M 11/28 |
| 2004/0046091 A1 | 3/2004 | Chuang | |
| 2008/0203255 A1 | 8/2008 | Workman et al. | |
| 2010/0187740 A1 | 7/2010 | Orgeron | |
| 2013/0094196 A1 | 4/2013 | Wessel | |
| 2013/0174711 A1 | 7/2013 | Lin | |
| 2013/0219705 A1 | 8/2013 | Scholtz et al. | |
| 2015/0183093 A1 | 7/2015 | Yan | |

FOREIGN PATENT DOCUMENTS

| | | |
|---|---|---|
| DE | 202004015938 U1 | 12/2004 |
| TW | M525826 U | 7/2016 |

\* cited by examiner

INDEXED COLLAR CLAMPS FOR TELESCOPING STAND

CROSS-REFERENCE TO RELATED APPLICATIONS

The present application claims benefit of priority to U.S. Provisional Patent Application No. 63/368,226, entitled "Repair Stand With Clamping Support Head," and filed on Jul. 12, 2022, which is specifically incorporated by reference herein. The present application is further related to U.S. patent application Ser. No. 18/351,356, entitled "Repositioning Clutch for a Clamping Support Head," and filed on Jul. 12, 2023, which is also specifically incorporated by reference herein.

BACKGROUND

Repair stands that allow for the stable and secure attachment of an object to a clamping support head are useful for bicycle maintenance and repair. Conventional bicycle repair stands often incorporate a clamping support head to grip a bicycle and allow the bicycle to be rotated in order to facilitate work on any component of the bicycle. A variety of user experience issues present in conventional repair stands and their associated clamping support heads are addressed by the improved bicycle repair stands and associated clamping support heads and indexed collar clamps disclosed herein.

SUMMARY

Implementations described and claimed herein address the foregoing problems by providing a telescoping stand comprising an inner tube, an outer tube partially overlapping the inner tube, wherein an overlapping end of the outer tube includes a compliance cut, a bushing positioned between the inner tube and the outer tube and adjacent the compliance cut, and an indexed collar clamp positioned over the outer tube and also adjacent the compliance cut. The bushing includes a protrusion that indexes the bushing to an aperture in the outer tube and to a slot in the indexed collar clamp.

Other implementations are also described and recited herein.

BRIEF DESCRIPTIONS OF THE DRAWINGS

DETAILED DESCRIPTIONS

The presently disclosed technology is directed towards bicycle repair stands and associated clamping support heads, including methods of using the same. The clamping support heads disclosed herein provide a clampable mouth having jaws that can securely hold and permit movement of a variety of different size and/or shape objects. Further, the objects may be quickly attached and quickly removed from the clamping support heads allowing easy use of the associated bicycle repair stands.

The presently disclosed technology provides an object support apparatus and methods of clamping objects. Objects may include any object such as, but not limited to: bicycles; parts of a bicycle such as a seat post, part of a frame and the like; stands; tubular members; rounded objects; shaped objects; power equipment such as weed eaters, chainsaws and the like; motorcycles; motorcycle parts; wheelchairs; ski equipment; building supplies; car parts; and the like. The discussion in this disclosure uses a bicycle as an example, yet it is meant to be understood that a wide range of objects can be used with the repair stands and associated clamping support heads and indexed collar clamps described herein.

Figure 1:
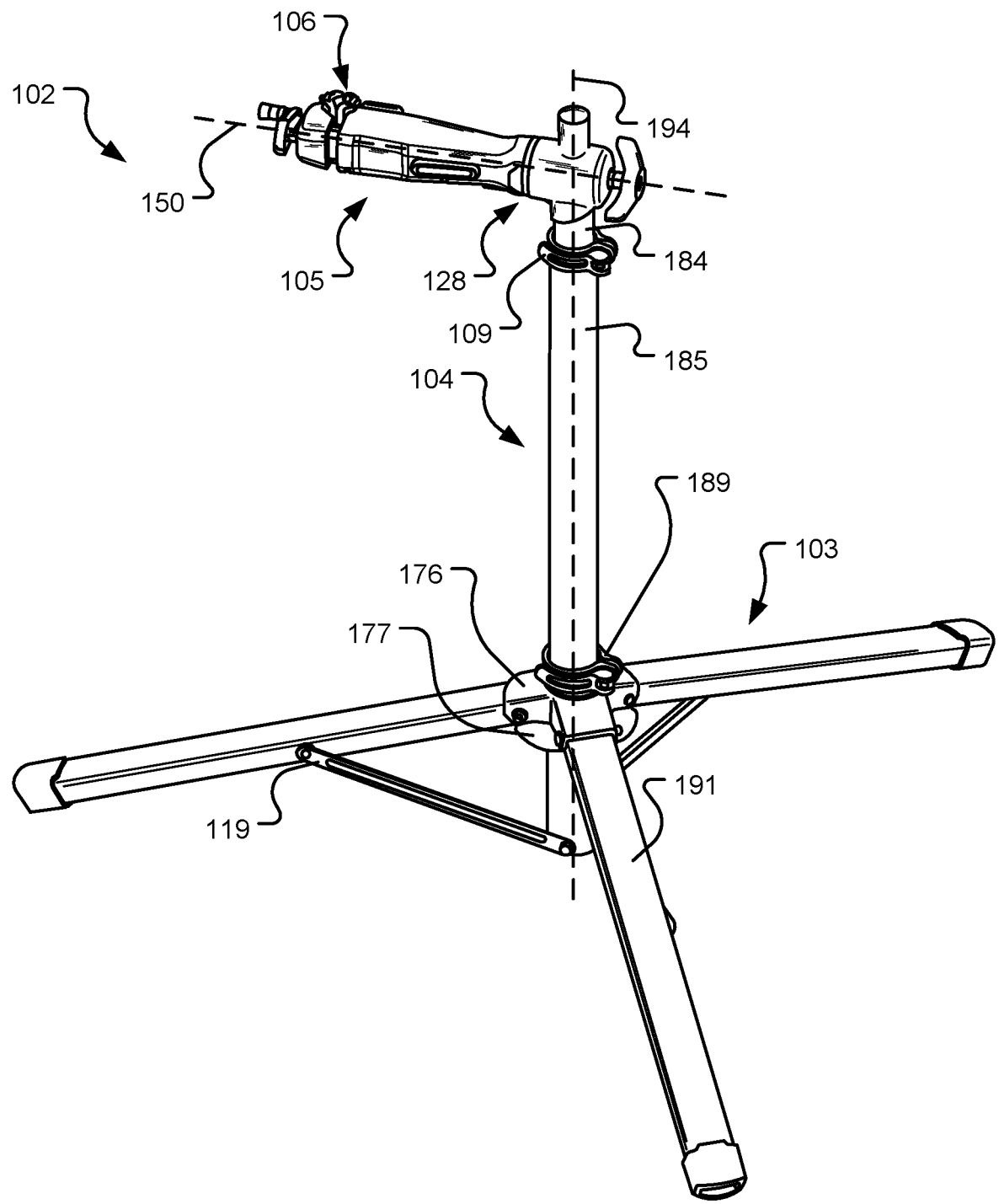
FIG. 1 illustrates a perspective view of an example repair stand including a clamping support head and indexed collar clamps for height adjustment.

FIG. 1 illustrates a first perspective view of an example repair stand 102 including a clamping support head 105 and indexed collar clamps 109, 189 for height adjustment and/or deployment of base 103. The clamping support head 105 includes a vice-like structure with an adjustable mouth 106 that permits the clamping support head 105 to secure an object, such as a bicycle frame (not shown). In various implementations, the mouth 106 may be used to attach the repair stand 102 to a bench, a wall, a surface, a car or other vehicle, for example.

The stand 102 includes the base 103 and a stem 104 connecting the clamping support head 105 to the tripod base 103 in an extendible manner. The base 103 may include three (forming a tripod, as shown) or more or less legs (e.g., leg 191) extending outwardly from leg fitting 176 for stability and may provide for adjusting a height of the stand 102 with an adjustable height stem 104. Adjustable height stems may include a telescopic portion, where an inner tube 184 of the stem 104 may be received into an outer tube 185 of the stem 104 for telescopically adjusting a height of the stand 102 along axis 194 (also referred to herein as first axis or stand axis). The indexed collar clamp 109 selectively secures the inner tube 184 to the outer tube 185 at a desired height of the stand 102.

In some implementations, the stem 104 includes an internal stop sleeve that limits the distance the inner tube 184 may retract into the outer tube 185. This limits the overall telescoping stroke of the telescoping stem 104 by limiting the length of the inner tube 184. This may be advantageous in meeting loading specifications by limiting overall possible extension of the telescoping stem 104.

The legs of the tripod base 103 are connected together at the leg fitting 176. The leg fitting 176 serves as a hub for the tripod legs and the telescoping stem 104. The leg fitting 176 incorporates indexed collar clamp 189 to selectively lock the leg fitting 176 to the outer tube 185, thereby allowing the leg fitting 176 to the selectively locked in a position where the tripod legs are fully deployed, as shown, fully retracted where the legs are substantially parallel to the axis 194, and any desired position therebetween. More specifically, in the depicted deployed position, the legs extend outwardly from the stem 104 in a hub-and-spoke fashion to provide stability to the repair stand 102. In the stowed position, the legs are stowed substantially adjacent and parallel to the stem 104.

In some implementations, the leg fitting 176 may function as an outer tube, while the outer tube 185 may function as an inner tube when used in conjunction with the indexed collar clamp 189. The indexed collar clamp 189 may then be used to secure the leg fitting 176 to the outer tube 185 with the legs of the tripod base 103 fully deployed, fully retracted, or at any desired position therebetween. In such cases, the leg fitting 176 may include or omit a compliance cut as the leg fitting itself may have sufficient compliance without the compliance cut. Support links (e.g., support link 119) further support their associated legs in the depicted deployed position and the stowed position.

The leg fitting 176 further includes handles (e.g., handle 177) between each of the tripod legs. In the case of a tripod stand, as there are three legs, there are three handles therebetween integrally molded within the leg fitting 176. The handles permit a user to easily lift the stand 102 at or near its bottom with one hand, and steady the stand 102 using the user's other hand. In various implementations, the leg fitting 176 is each made of cast aluminum or other alloy, or in some cases an injection molded plastic. Regardless of material construction, the leg fitting 176 is made of a material sufficiently strong to remain substantially rigid over a range of expected forces applied to the stand 102.

The adjustable mouth 106 is rotatable to provide adjustability to positioning a clamped object. More specifically, the head 105 may be rotated about axis 150 (also referred to herein as second axis or head axis) using a repositioning clutch 128 so that the head 105 may be rotated and selectively held into a desired rotated position. In various implementations, the axis 150 extends through the axis 194 and is substantially perpendicular to the first axis, as shown. The head 105 may further be pivotable at the repositioning clutch 128 to provide for compact storage so that the adjustable mouth 106 attached to the head 105 may be folded along the stem 104 of the stand 102.

Figure 2:
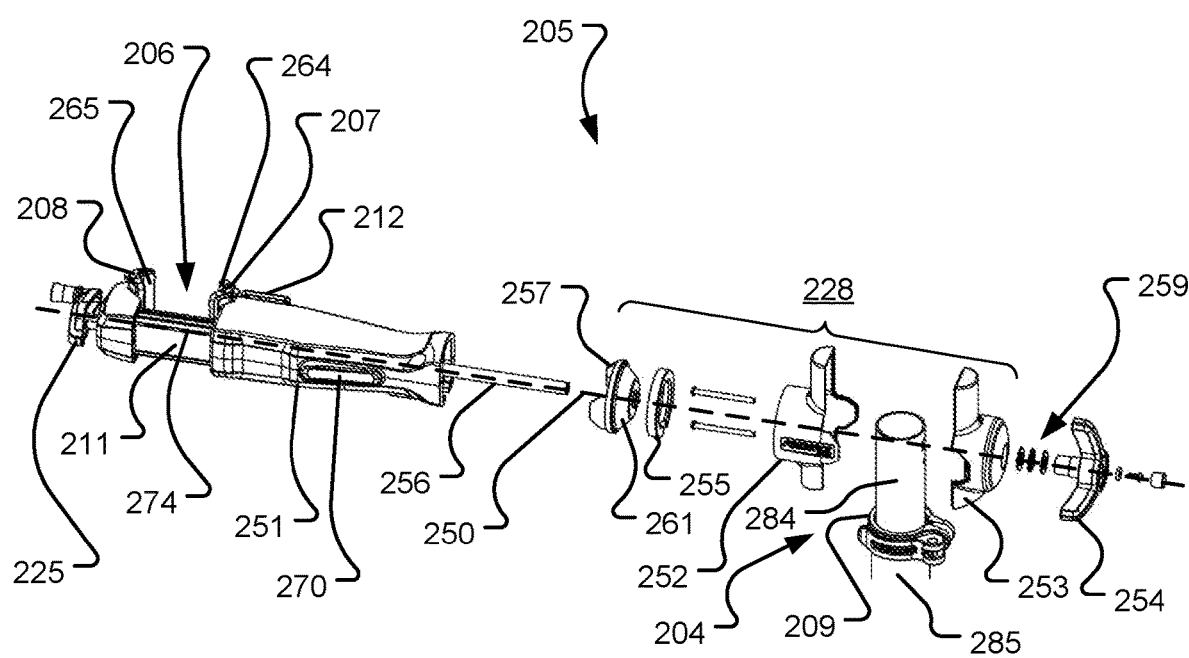
FIG. 2 illustrates a perspective exploded view of an example clamping support head for a repair stand.

FIG. 2 illustrates a perspective exploded view of an example clamping support head 205 for a repair stand (mostly not shown, see e.g., stand 102 of FIG. 1). The clamping support head 205 is attached to stem 204 of a stand (not shown, see e.g., stand 102 of FIG. 1). Adjustable height stems may include a telescopic portion, where an inner tube 284 of the stem 204 is received into an outer tube 285 of the stem 204 for telescopically adjusting a height of the stand. Indexed collar clamp 209 selectively secures the inner tube 284 to the outer tube 285 at a desired height of the stand. Clampable mouth 206 of the clamping support head 205 includes a fixed jaw 207 and a translating jaw 208. The jaws 207, 208 are selectively closed to hold or compress an object (e.g., a bicycle frame, not shown), without or minimizing damage to the object. The jaws 207, 208 are selectively opened to release the object from the clamping support head 205.

Each of the jaws 207, 208 may include inwardly angled or curved contact surfaces, as shown, which may be referred to herein as a convex grip. A convex grip surface may allow for secure gripping of a large range of sizes of objects. More specifically, it may provide gripping security for smaller, commonly clamped objects, such as bicycle seat posts and the like, without greatly compromising gripping security for larger objects that may or may not be round in section, such as some bicycle frames. Small to large objects with a round or ovoid section may engage with contact surfaces on each of the jaws 207, 208 including at least two contact points to each jaw. Other implementations may have differently shaped jaws 207, 208 than that described above and illustrated in FIG. 2.

To enhance gripping, the jaws 207, 208 may each be equipped with removable and replaceable molded resilient pads 264, 265. The replaceable molded resilient pads 264, 265 may further have a textured contact surface for additional gripping (e.g., ribbing, hatching, etc.). The textured contact surface may include raised bumps, horizontal or vertical raised lines and the like. This may provide an improved user experience as light compression of the jaws 207, 208 is met with more resilience and heavier compression of the jaws 207, 208 is met with less resilience. Alternatively, contact surfaces for the replaceable molded resilient pads 264, 265 may be smooth.

A slide 211 is attached to the translating jaw 208 so that the slide 211 and the translating jaw 208 move together but slide apart from the fixed jaw 207 when opening the mouth 206 and slide together when closing the mouth 206. The slide 211 selectively projects from an arm 251 of the clamping support head 205 in a telescoping manner. The slide 211 includes replaceable molded resilient strips (e.g., strip 274) that occupy some or all (e.g., the top two) longitudinal edges of the slide 211, which is generally rectangular in cross section. By occupying two or more longitudinal edges of the slide 211, the replaceable molded resilient strips are effective at cushioning any contact between an object to be clamped within the mouth 206 and the slide 211 so long as the object to be clamped within the mouth 206 is larger than a cross-section height or width dimension of the slide 211.

The replaceable molded resilient pads 264, 265 and/or replaceable molded resilient strips may be made of a material including but not limited to natural or synthetic rubbers, elastomers, thermoplastic urethanes and the like so that they may grasp an object and/or prevent scratching or damaging the object. The replaceable molded resilient pads 264, 265 and replaceable molded resilient strips may be injection molded or otherwise manufactured as a separate component from the jaws 207, 208 and slide 211 to which they are removably attached, respectively. In various implementations, a user may replace the pads 264, 265 and/or replaceable molded resilient strips with merely the user's hands. Further, the pads 264, 265 and/or replaceable molded resilient strips may be of various sizes, shapes, and hardness (by virtue of material construction) to adapt the jaws 207, 208 and/or slide 211 for an intended object or range of objects to the clamped.

Helper magnet 270 is embedded within or affixed to the arm 251 and serves as a place to quickly and conveniently store ferromagnetic materials (e.g., tools, fasteners, and components) that may be used when performing work on an object clamped within the head 205. While generally standing proud of the arm 251, the arm 251 may be flush with the helper magnet 270 in a middle area of the helper magnet 270 to allow ferromagnetic materials that are larger than the helper magnet 270 to be in contact with the helper magnet 270 to maximize magnetic hold. While the helper magnet 270 is depicted as an oblong shape in FIG. 2, the helper magnet 270 may be any shape and size appropriate to fit available space on the head 205. The helper magnet 270 may be constructed of any permeant magnetic material (e.g., rare earth magnets, such as neodymium and samarium-cobalt).

The object may be placed into the mouth 206 of the clamping support head 205 when the translating jaw 208 at an open position with reference to the fixed jaw 207, as can be seen in FIG. 2. The open position may be considered any position where the translating jaw 208 is at an extended position allowing for the object to fit between the fixed jaw 207 and the translating jaw 208. Once the object is placed, a user moves the translating jaw 208 toward the fixed jaw 207 with the object clamped therebetween. The user may apply force to the translating jaw 208 to cause the slide 211 to retract within the clamping support head 205 and the mouth 206 to move from the open position to the closed position. The closed position may include placing the translating jaw 208 tightly around the object so as to secure the object in place within the mouth 206 such that the object may not be moved within the mouth 206 under application of expected force.

The mouth 206 (and the translating jaw 208) may be maintained at the desired closed position so that the object may remain clamped without application of additional force. For example, the translating jaw 208 may be unidirectional in freedom of movement so that the translating jaw 208 may be moved in a closing direction and prevented from moving in an opposite opening direction. For example, a ratchet mechanism (not shown) engages with the slide 211 and provides the unidirectional freedom of movement of the translating jaw 208. The ratchet mechanism may include a toothed bar such as, but not limited to, a lead screw having threads, a ratchet wheel having teeth, and the like. When used as a ratchet, threads on the lead screw may act like teeth to which a pawl may move along. The pawl may be adapted to engage with teeth of the ratchet mechanism, for example, with threads of the lead screw or the like preventing movement in the opening direction.

The presently disclosed technology may provide selective fine adjustment (e.g., tightening and loosening) of the translating jaw 208 around the object after the translating jaw 208 has been placed in the closed position. This fine adjustment may vary the force applied by the jaws 207, 208 around the object, such as with a rotating force adjustment knob 225. For example, the knob 225 may be used to tighten or loosen the translating jaw 208 with the object clamped against the fixed jaw 207 and effect a desired fine adjustment (tightening or loosening) of the translating jaw 208 based on a direction of rotation of the knob. In other implementations, other jaw force adjustment elements may be used in place of the described and illustrated knob 225 with similar effect. Further, the knob 225 may have a variety of configurations to assist a user in grasping and turning the knob 225.

The object may be released from the mouth 206 using a quick release 212. The quick release 212 may be a relatively low-force button that disengages a pawl from a lead screw to permit bidirectional movement of the translating jaw 208 and the slide 211 under closing or opening force applied on the translating jaw 208 by the user. The user may selectively utilize the quick release 212 to open the mouth 206 of the clamping support head 205 to release the object therefrom. While illustrated and described as a relatively low-force button, the quick release 212 may in various implementations be a button, knob, latch, handle, lever or the like which may be pulled, pressed, pushed, slid or the like to disengage the pawl from the lead screw or otherwise release the ratchet mechanism maintaining a compressive hold on the object. When the quick release 212 is triggered, a substantially simultaneous movement of the translating jaw 208 and the slide 211 to open the mouth 206 may occur. As such, the mouth 206 may open nearly concurrently with a triggering of the quick release 212. The mouth 206 may open within seconds or perhaps even in less than a second of triggering the quick release 212, for example.

The clamping support head 205 is rotatable to provide adjustability to positioning a clamped object. More specifically, the head 205 may be rotated about axis 250 and may include a repositioning clutch 228 that permits the arm 251 of the clamping support head 205 to rotate with reference to the stem 204 and be selectively held into a desired rotated position. In further implementations, the head 205 may be pivotable at the repositioning clutch 228 to provide for compact storage so that the clamping support head 205 may be folded to run substantially parallel to the stem 204 and an associated stand.

The repositioning clutch 228 includes a two-part body 252, 253, a bearing plate 257, and a friction ring 255. The friction ring 255 includes a bevel (not shown, see e.g., bevel 360 of FIG. 3) that matches a corresponding bevel 261 in the bearing plate 257. When assembled, clutch shaft 256 of the clamping support head 205 extends through the bearing plate 257, the friction ring 255, the body 252, 253, and roller bearing 259, in sequence, to meet rotating handle 254. The roller bearing 259 includes a set of flat washers to provide bearing surfaces for wear on the body 253 and the rotating handle 254. The roller bearing 259 permits the rotating handle 254 to be rotated with smooth operation and minimized resistance provided by the body 253 and wear on the body 253. The rotating handle 254 is screwed onto the clutch shaft 256 thereby adjusting compression force within the repositioning clutch 228, which in turn affects the force required for the clamping support head 205 to rotate within reference to the stem 204 and an associated stand about the axis 250.

Figure 3:
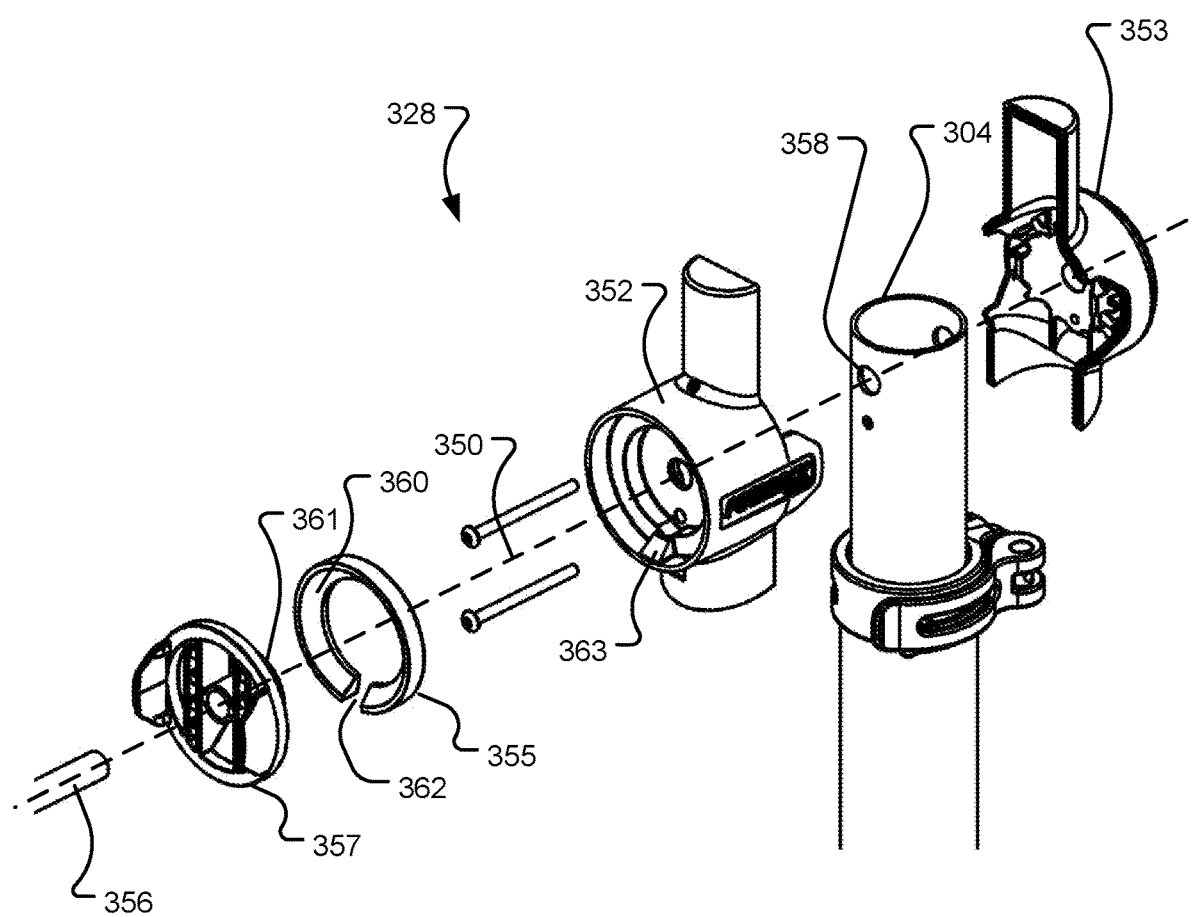
FIG. 3 illustrates a perspective exploded view of an example repositioning clutch within a clamping support head for a repair stand.

FIG. 3 illustrates a perspective exploded view of an example repositioning clutch 328 within a clamping support head (not shown, see e.g., clamping support head 205 of FIG. 2) for a repair stand (not shown, see e.g., stand 102 of FIG. 1). A two-part body 352, 353 compressively clamps onto opposing sides of the stem 304 (e.g., an inner or outer tube of a telescoping stand) to secure the repositioning clutch 328 to the stem. When assembled, clutch shaft 356 of the clamping support head extends through bearing plate 357, friction ring 355, the two-part body 352, 353, aperture 358 in stem 304 of the repair stand, and a roller bearing (not shown, see e.g., roller bearing 259 of FIG. 2), in sequence, to meet a rotating handle (not shown, see e.g., rotating handle 254 of FIG. 2). The body 353 provides a seat for the rotating handle and the body 352 provides a seat on an opposite side of the stem 304 for the friction ring 355.

The friction ring 355 includes a slot 362 that is keyed to protrusion 363 in the body 352. When the friction ring 355 is seated onto the body 352, the slot 362 and protrusion 363 prevents the friction ring 355 from rotating with reference to the body 352. The friction ring 355 further includes a bevel 360 that matches a corresponding bevel 361 in the bearing plate 357. The matching bevels 360, 361 provide a self-centering function to the repositioning clutch 328, particularly as it is tightened, and an area of increased bearing surface area between the friction ring 355 and the bearing plate 357 as compared to an implementation that lacks the matching bevels 360, 361. The bevel angle is used in part to define a surface area between the friction ring 355 and the bearing plate 357 that best matches the intended application of the repositioning clutch 328.

If the self-centering function and increased surface area is not required or desired, in other implementations, the friction ring 355 and the bearing plate 357 each lack their respective matching bevels 360, 361. A coefficient of friction and area of bearing contact between the friction ring 355 and the bearing plate 357 defines the compressive force required to yield a desired resistance to rotation of the clamping support head to rotate within reference to the stem 304 and an associated stand about axis 350. The repositioning clutch 328 is capable of rotating to any desired position with potentially infinite adjustability within a 360-degree range.

The friction ring 355 may be slip-fit or press-fit within the bearing plate 357 and thus removably replaceable from the body 352. This allows the friction ring 355 to be replaced if it is damaged or worn out. Further, different higher or lower friction materials and/or surface finishing can be used for the friction ring 355 that may be optimized for a specific application. For example, the friction ring 355 can be customized for a specific application, and then potentially changed out for a different application that would best utilize a higher or lower coefficient of friction between the friction ring 355 and the bearing plate 357. Finally, the removable friction ring 355 may minimize its material thickness (and thus overall material consumption) as it can designed for replacement rather than for the life of the repositioning clutch 328.

In various implementations, the two-part body 352, 353 components are each made of a cast aluminum or other alloy, or in some cases an injection molded plastic. Regardless of material construction, the two-part body 352, 353 components are made of a material sufficiently strong to remain substantially rigid over a range of expected forces applied on the two-part body 352, 353 (e.g., compressive forces applied by tightening the rotating handle and bending force applied by the weight of an object mounted within a mouth of an associated clamping support head.

In various implementations, the friction ring 355 is made of an injection molded plastic part (e.g., polyetherimide) that provides desirable coefficient of friction in combination with the bearing plate 357 material construction across an area of contact (e.g., matching bevels 360, 361) between the friction ring 355 and the bearing plate 357. Similarly, the bearing plate 357 may be made of a cast zinc or other metal alloy part (or includes a seat for the friction ring 355 that is made of a cast zinc or other metal alloy part) that that provides desirable coefficient of friction in combination with the friction ring 355 material construction across an area of contact between the friction ring 355 and the bearing plate 357.

In other implementations, the material construction of the friction ring 355 and the bearing plate 357 are swapped from the discussed above, or both the friction ring 355 and the bearing plate 357 may be of an injection molded plastic or a metal alloy. In addition, a surface finishing may be applied to one or both of the friction ring 355 and the bearing plate 357 at the area of contact between the friction ring 355 and the bearing plate 357 to increase or decrease the coefficient of friction therebetween. Choice of material construction and/or surface finishing of the friction ring 355 and the bearing plate 357 and the area of contact therebetween are chosen based on a desired compressive force required to yield a desired resistance to rotation of the clamping support head to rotate within reference to the stem 304.

Figure 4:
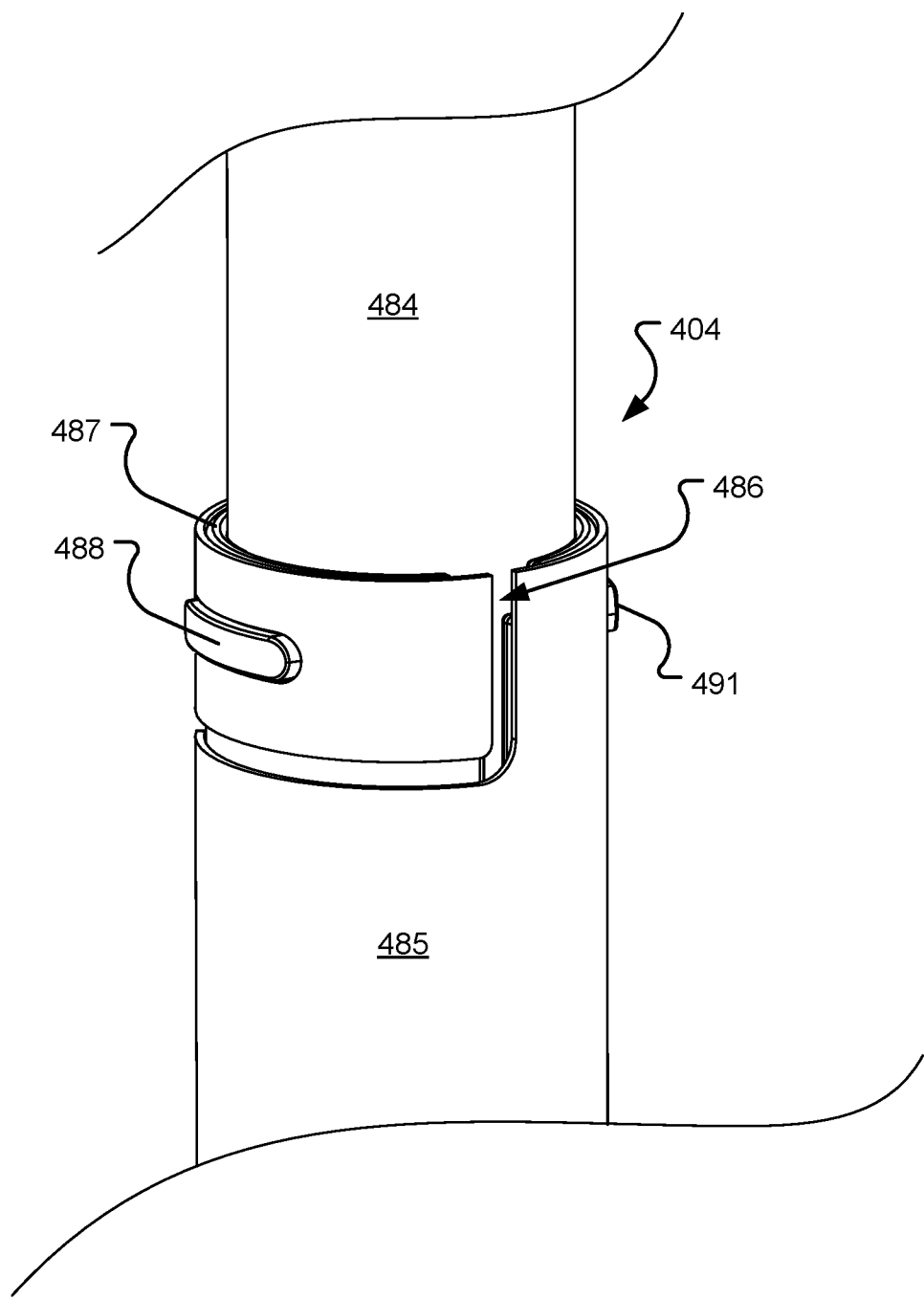
FIG. 4 illustrates a partial perspective view of an example telescoping stem for a repair stand, the telescoping stem including a compliance cut and an inner bushing.

FIG. 4 illustrates a partial perspective view of an example telescoping stem 404 for a repair stand (not shown, see e.g., stand 102 of FIG. 1), the telescoping stem 404 including a compliance cut 486 and an inner bushing 487. In various implementations, the clamping support heads disclosed herein (e.g., clamping support head 105 of FIG. 1) may be attached to one end of the telescoping stem 404, while the bases disclosed herein (e.g., base 103 of FIG. 1) may be attached to an opposite end of the telescoping stem 404. The portion of the telescoping stem depicted in FIG. 4 is where an inner tube 484 of the telescoping stem 404 meets a partially overlapping outer tube 485 of the telescoping stem 404 (e.g., at top and/or bottom ends of the telescoping stem 404), for example, where the telescoping stem 404 is capable of telescoping.

The compliance cut 486 runs axially down a length of the outer tube 485, and then radially across the outer tube 485 for a partial circumference of the outer tube 485. The compliance cut 486 enables the outer tube to compress against the inner bushing 487 and inner tube 484 by occupying some or all of the space within the axial cut down the length of the outer tube 485. The bushing 487 occupies a space between the inner tube 484 and the outer tube 485 and serve to fill that space and provide compliance between the inner tube 484 and the outer tube 485. The bushing 487 includes protrusions 488, 491 that register with corresponding apertures in the outer tube 485. This holds the bushing 487 in position between the inner tube 484 and the outer tube 485, both axially down the outer tube 485 and radially across the outer tube 485. In some implementations, the bushing 487 is made of two parts, each of which includes one of the protrusions 488, 491. The bushing 487 may be made of a material including but not limited to natural or synthetic rubbers, elastomers, thermoplastic urethanes and the like that provides a desired compliance between the inner tube 484 and the outer tube 485.

Figure 5:
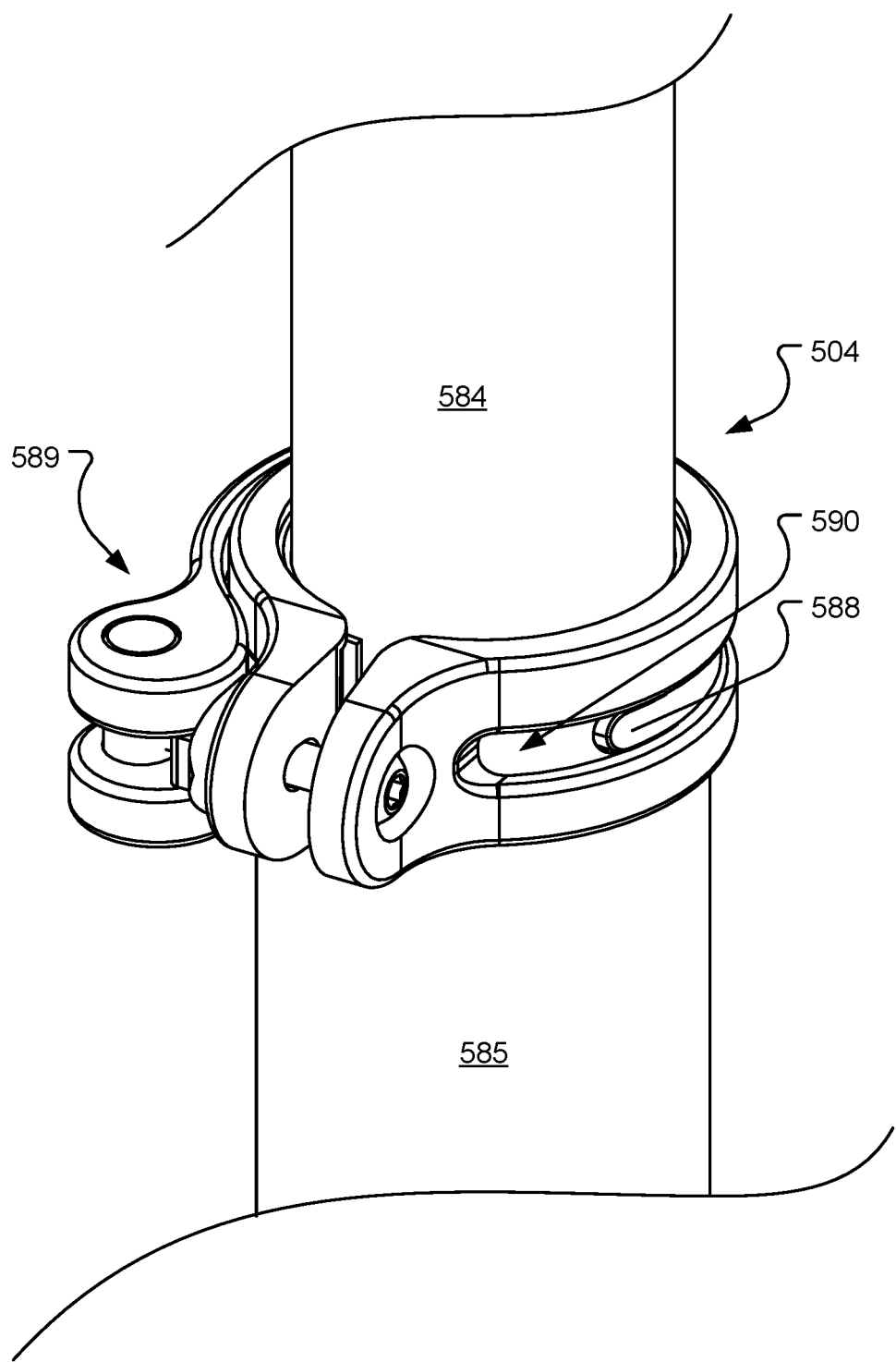
FIG. 5 illustrates the telescoping stem of FIG. 4, further including an indexed collar clamp.

FIG. 5 illustrates the telescoping stem 404 of FIG. 4, further including an indexed collar clamp 589. The indexed collar clamp 589 is arranged over inner tube 584 and an overlapping end of outer tube 585 with a bushing (not shown, see e.g., bushing 487 of FIG. 4) therebetween and allows a user to utilize mechanical leverage to provide and maintain a clamping force on the outer tube 585 that locks telescoping stem 504 in place. Protrusion 588 of the bushing extends outward from the outer tube 585 and registers with slot 590 in the indexed collar clamp 589. The slot 590 holds the indexed collar clamp 589 in position over the outer tube 585, both axially down the outer tube 585 and radially across the outer tube 585.

In some implementations, some tolerance for a predefined range of movement (e.g., up to 30-degrees of movement) of the indexed collar clamp 589 radially across the outer tube 585 is allowed for by an oversized slot 590 as compared to the protrusion 588, as shown in FIG. 5. In other implementations, the slot 590 is not oversized and is substantially matched to the protrusion 588, which prevents any substantial movement of the indexed collar clamp 589 radially across the outer tube 585. While the indexed collar clamp 589 is depicted as a variant of a quick release skewer, other adjustable clamping mechanisms that may be indexed as discussed above are contemplated herein. The indexed collar clamp 589 of FIG. 5 and/or underlying compliance cut 486 and an inner bushing 487 of FIG. 4 may be applied to various positions on a repair stand (e.g., positions occupied by one or both of indexed collar clamps 109, 189 of FIG. 1). Further, when used in conjunction with a base (e.g., base 103 of FIG. 1) having legs (e.g., leg 191 of FIG. 1), the indexed collar clamp 589 may be used to lock the legs in one of a stowed position (e.g., with the legs oriented substantially parallel to the axis 194 of FIG. 1) and a deployed position (e.g., as illustrated in FIG. 1) with reference to the outer tube 585.

Figure 6:
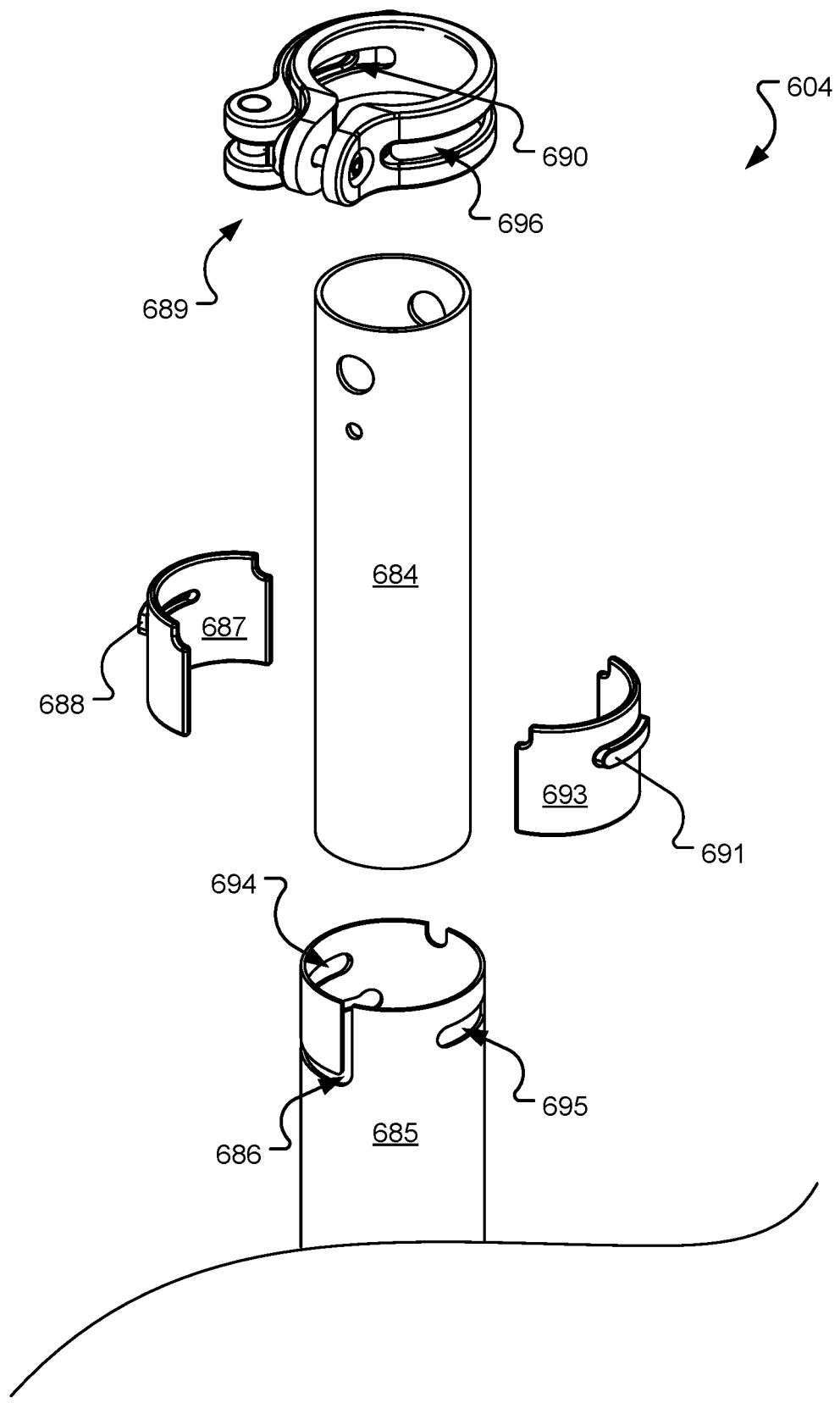
FIG. 6 illustrates a perspective exploded view of the telescoping stem of FIG. 4, including the indexed collar clamp of FIG. 5.

FIG. 6 illustrates a perspective exploded view of the telescoping stem 404 of FIG. 4, including the indexed collar clamp 589 of FIG. 5. In various implementations, the clamping support heads disclosed herein (e.g., clamping support head 105 of FIG. 1) may be attached to the depicted end of the telescoping stem 604, while the bases disclosed herein (e.g., base 103 of FIG. 1) may be attached to an opposite end of the telescoping stem 604 that is not depicted in FIG. 6. The portion of telescoping stem 604 depicted in FIG. 6 is where an inner tube 684 of the telescoping stem 604 meets a partially overlapping outer tube 685 of the telescoping stem 604 (e.g., at top and/or bottom ends of the telescoping stem 604), for example, where the telescoping stem 604 is capable of telescoping.

Compliance cut 686 runs axially down a length of the outer tube 685 on its depicted distal end, and then radially across the outer tube 685 for a partial circumference of the outer tube 685. The compliance cut 686 enables the outer tube to compress against an inner bushing, which is made up of two bushing parts 687, 693, and inner tube 684 by occupying some or all of the space within the axial cut down the length of the outer tube 685. The two bushing parts 687, 693 in combination substantially encircle the inner tube 684 when assembled.

The bushing occupies a space between the inner tube 684 and the outer tube 685 and serves to fill that space and provide compliance between the inner tube 684 and the outer tube 685. The bushing parts 687, 693 include protrusions 688, 691 that register with corresponding apertures 694, 695 in the outer tube 685, respectively. This holds the bushing in position between the inner tube 684 and the outer tube 685, both axially down the outer tube 685 and radially across the outer tube 685.

The indexed collar clamp 689 is arranged over inner tube 684 and an overlapping end of outer tube 685 with the bushing therebetween and allows a user to utilize mechanical leverage to provide and maintain a clamping force on the outer tube 685 that locks telescoping stem 604 in place, when assembled. Protrusions 688, 691 of the bushing extend outward through the outer tube 685 and register with slots 690, 696 in the indexed collar clamp 689, respectively. The slots 690, 696 holds the indexed collar clamp 689 in position over the outer tube 685, both axially down the outer tube 685 and radially across the outer tube 685. In some implementations, some tolerance for a predefined range of movement of the indexed collar clamp 689 radially across the outer tube 685 is allowed for by oversized slots 690, 696 as compared to the protrusions 688, 691, respectively. In other implementations, the slots 690, 696 are not oversized and are substantially matched to the protrusions 688, 691, which prevents any substantial movement of the indexed collar clamp 689 radially across the outer tube 685.

While the indexed collar clamp 689 is depicted as a variant of a quick release skewer, other adjustable clamping mechanisms that may be indexed as discussed above are contemplated herein. The indexed collar clamp 689 of FIG. 6 and/or underlying compliance cut 686 and bushing may be applied to various positions on a repair stand (e.g., positions occupied by one or both of indexed collar clamps 109, 189 of FIG. 1). Further, when used in conjunction with a base (e.g., base 103 of FIG. 1) having legs (e.g., leg 191 of FIG. 1), the indexed collar clamp 689 may be used to lock the legs in one of a stowed position (e.g., with the legs oriented substantially parallel to the axis 194 of FIG. 1) and a deployed position (e.g., as illustrated in FIG. 1) with reference to the outer tube 585.

Figure 7:
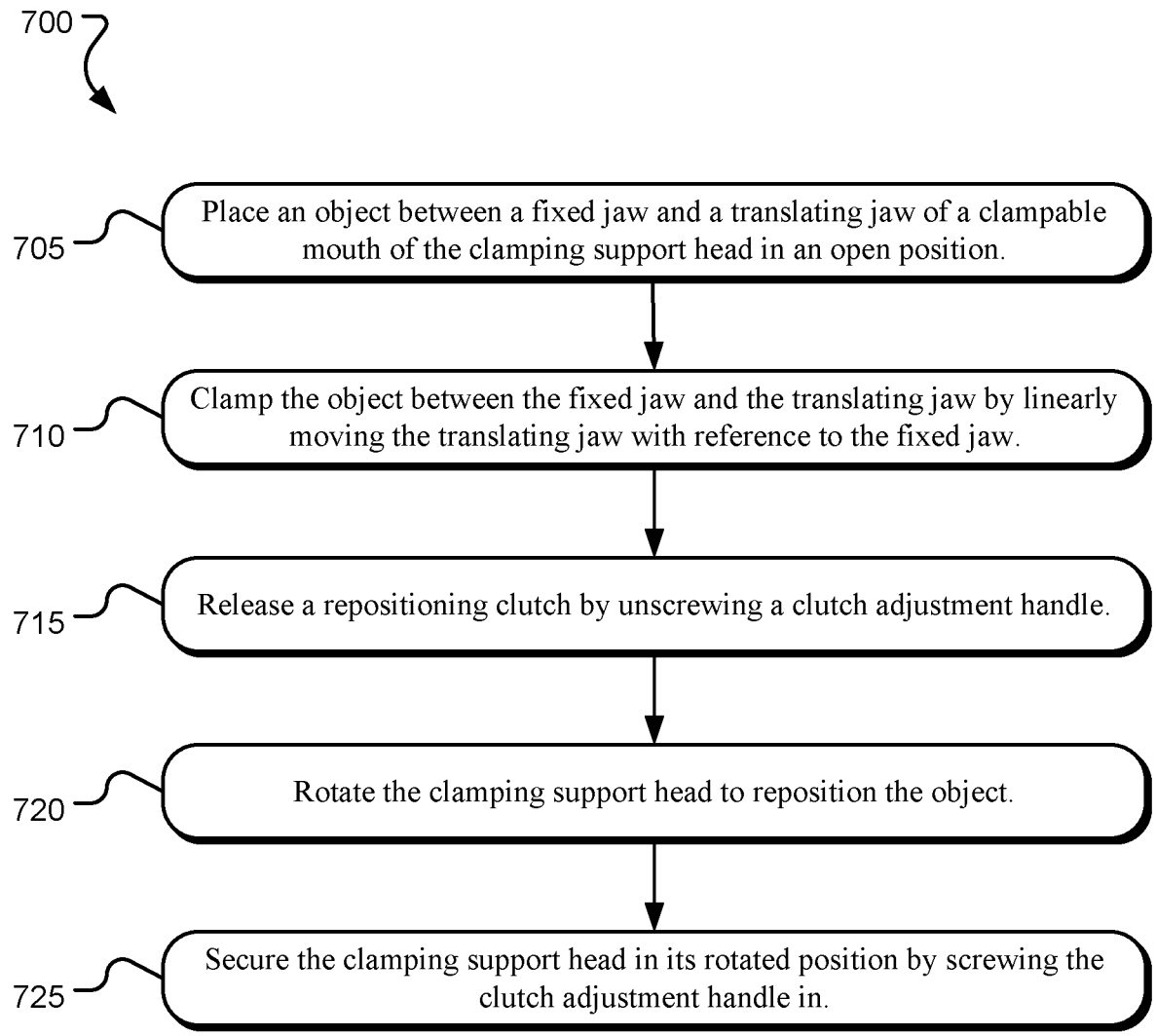
FIG. 7 illustrates example operations for using an example repair stand including a clamping support head with a repositioning clutch.

FIG. 7 illustrates example operations 700 for using an example repair stand including a clamping support head with a repositioning clutch. The clamping support head is used to secure and position an object, such as a bicycle frame, for inspection, maintenance, and/or repair operations. A placing operation 705 places the object between a fixed jaw and a translating jaw of a clampable mouth of the clamping support head in an open position. A clutch shaft extends from the clamping support head along a head axis.

A clamping operation 710 clamps the object between the fixed jaw and the translating jaw by linearly moving the translating jaw with reference to the fixed jaw. The clamping operation 710 may be first accomplished by compressing a ratcheting mechanism to close the mouth around the object. A tightening mechanism may then be used to tightening the translating jaw against the fixed jaw after the clampable mouth is placed in the closed position.

A releasing operation 715 releases a repositioning clutch by unscrewing a clutch adjustment handle screwed onto a terminal end of the clutch shaft thereby permitting the clamping support head to selectively rotate about the head axis. This allows the clamping support head to rotate independently of the remainder of the repair stand, including in some implementations a base (e.g., a tripod). A rotating operation 720 rotates the clamping support head to reposition the object. The object may be repositioned in a manner that a user finds most conducive to performing inspection, maintenance, and/or repair operations on the object.

A securing operation 725 secures the clamping support head in its rotated position by screwing the clutch adjustment handle onto the terminal end of the clutch shaft to apply compression force on a bearing interface between a friction ring and a bearing plate within the repositioning clutch. The compression force applied on the bearing interface is sufficient to hold the clamping support head and the object in a desired position, even if the weight of the object or other expected forces applied on the object work to move the object away from the desired position. The rotating and securing operations 720, 725 may be iteratively repeated to move the object and ensure that the object stays in position.

Figure 8:
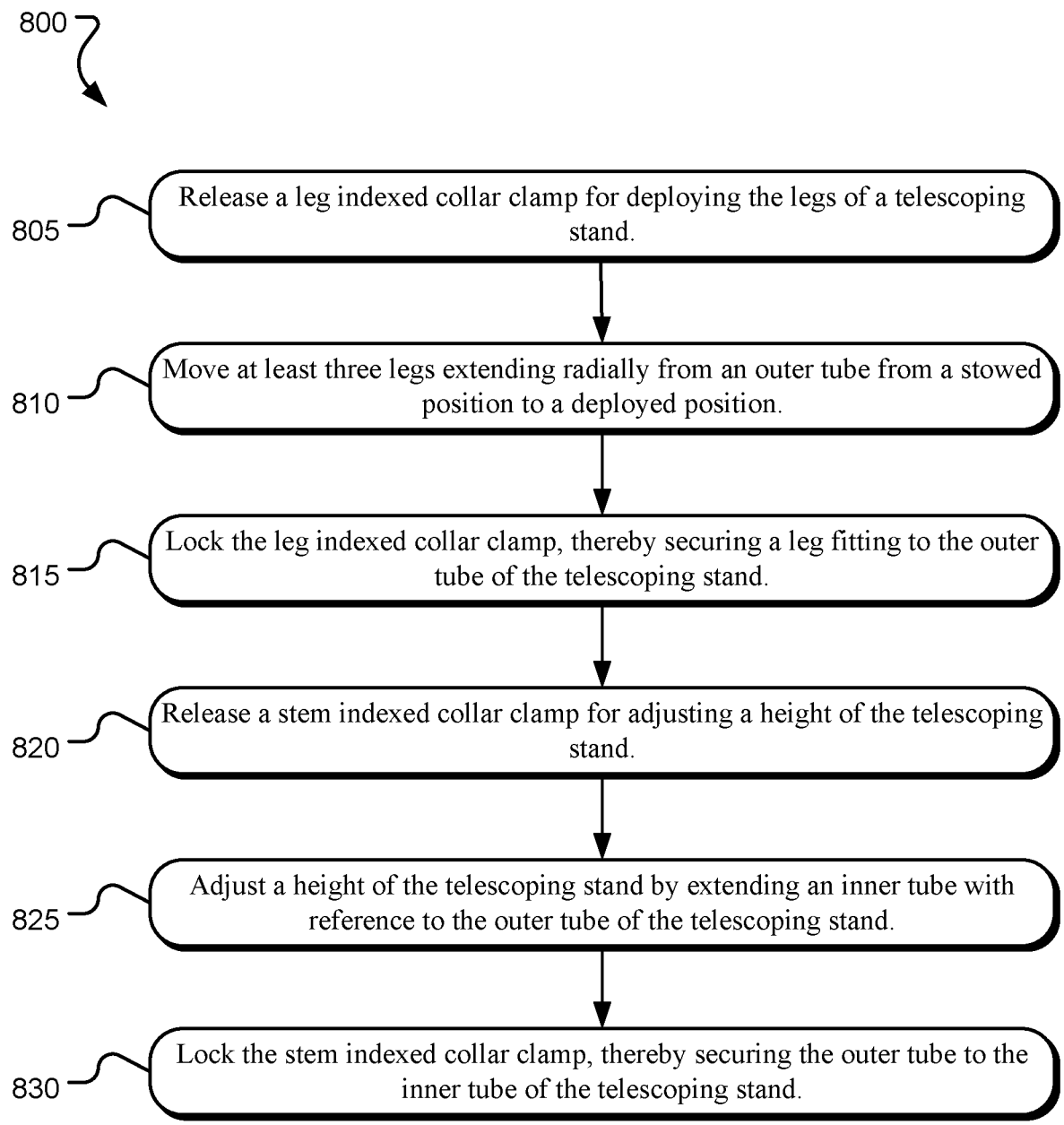
FIG. 8 illustrates example operations for deploying a telescoping stand utilizing one or more indexed collar clamps.

FIG. 8 illustrates example operations 800 for deploying a telescoping stand utilizing one or more indexed collar clamps. A first releasing operation 805 releases a leg indexed collar clamp for deploying the legs of the telescoping stand. The leg indexed collar clamp is positioned over a leg fitting overlapping an outer tube of the telescoping stand. The telescoping stand includes a bushing positioned between the outer tube and the leg fitting, wherein the bushing includes a protrusion that indexes the bushing to an aperture in the leg fitting. The protrusion from the bushing further indexes the bushing to a slot in the leg indexed collar clamp.

A moving operation 810 moves at least three legs extending radially from the outer tube from a stowed position to a deployed position by sliding the leg fitting downward along the outer tube of the telescoping stand. A locking operation 815 locks the leg indexed collar clamp, thereby securing the leg fitting to the outer tube of the telescoping stand. This secures the legs in the deployed position. Operations 805, 810, 815 may be repeated with the leg fitting slid upward along the outer tube of the telescoping stand to move the from the deployed position to the stowed position, or to any position therebetween.

A second releasing operation 820 releases a stem indexed collar clamp for adjusting a height of the telescoping stand. The stem indexed collar clamp is positioned over an end of the outer tube partially overlapping an inner tube of the telescoping stand. The overlapping end of the outer tube includes a compliance cut. The telescoping stand further includes a bushing positioned between the inner tube and the outer tube and adjacent the compliance cut. This bushing includes a protrusion that indexes the bushing to an aperture in the outer tube. This protrusion from the bushing further indexes the bushing to a slot in the stem indexed collar clamp.

An adjusting operation 825 adjusts a height of the telescoping stand by extending the inner tube with reference to the outer tube of the telescoping stand. The adjusted height is intended to be a height where a user will be able to move effectively and comfortably use the telescoping stand. A locking operation 830 locks the stem indexed collar clamp, thereby securing the outer tube to the inner tube of the telescoping stand. This secures the stem at the adjusted height of the telescoping stand. Operations 820, 825, 830 may be repeated with the inner tube slid upward and/or downward with reference to the outer tube to adjust the height of the telescoping stand. In some implementations, the height of the telescoping stand may be minimized for transportation or storage of the telescoping stand.

The above specification, examples, and data provide a complete description of the structure and use of exemplary implementations of the presently disclosed technology. Since many implementations of the presently disclosed technology can be made without departing from the spirit and scope of the presently disclosed technology, the invention resides in the claims hereinafter appended. Furthermore, structural features of the different implementations may be combined in yet another implementation without departing from the recited claims.

What is claimed is:

1. A telescoping stand comprising:
    an inner tube;
    an outer tube partially overlapping the inner tube, wherein an overlapping end of the outer tube includes a compliance cut;
    a bushing positioned between the inner tube and the outer tube and adjacent the compliance cut, wherein the bushing includes a protrusion that indexes the bushing to an aperture in the outer tube; and
    an indexed collar clamp positioned over the outer tube and also adjacent the compliance cut, wherein the protrusion from the bushing further indexes the bushing to a slot in the indexed collar clamp.

2. The telescoping stand of claim 1, wherein the compliance cut runs axially down a length of the outer tube and radially across the outer tube for a partial circumference of the outer tube.

3. The telescoping stand of claim 2, wherein the compliance cut permits the outer tube to compress against the bushing and inner tube by occupying some or all of a space within the axial cut down the length of the outer tube.

4. The telescoping stand of claim 1, wherein the protrusion from the bushing holds the bushing in position between the inner tube and the outer tube, both axially down the outer tube and radially across the outer tube.

5. The telescoping stand of claim 1, wherein the protrusion from the bushing holds the indexed collar clamp in position over the outer tube, both axially down the outer tube and radially across the outer tube.

6. The telescoping stand of claim 1, wherein the slot is oversized to permit a predefined range of movement of the clamping assembly radially across the outer tube.

7. The telescoping stand of claim 1, wherein the inner tube and the outer tube together form a stem of the telescoping stand.

8. The telescoping stand of claim 1, further comprising:
    at least three legs extending radially from the outer tube, wherein the indexed collar clamp is used to lock the legs in one of a stowed position and a deployed position with reference to the outer tube.

9. The telescoping stand of claim 8, wherein the inner tube is an outer tube of a stem of the telescoping stand and the outer tube is a leg fitting serving as a hub for the at least three legs.

10. The telescoping stand of claim 1, further comprising:
    a clamping support head fixedly attached to the inner tube.

11. The telescoping stand of claim 1, wherein the stem includes an internal stop sleeve that limits a telescoping stroke of the stem.

12. A telescoping stand comprising:
    an inner tube;
    an outer tube partially overlapping the inner tube, wherein an overlapping end of the outer tube includes a compliance cut;
    a first bushing positioned between the inner tube and the outer tube and adjacent the compliance cut, wherein the first bushing includes a first protrusion that indexes the bushing to an aperture in the outer tube;
    a first indexed collar clamp positioned over the outer tube and also adjacent the compliance cut, wherein the first protrusion from the first bushing further indexes the first bushing to a slot in the first indexed collar clamp;
    a leg fitting overlapping the outer tube;
    a second bushing positioned between the outer tube and the leg fitting, wherein the second bushing includes a second protrusion that indexes the second bushing to an aperture in the leg fitting; and
    a second indexed collar clamp positioned over the leg fitting, wherein the second protrusion from the second bushing further indexes the second bushing to a slot in the leg fitting.

13. The telescoping stand of claim 12, wherein the compliance cut runs axially down a length of the outer tube and radially across the outer tube for a partial circumference of the outer tube.

14. The telescoping stand of claim 13, wherein the compliance cut permits the outer tube to compress against the first bushing and inner tube by occupying some or all of a space within the axial cut down the length of the outer tube.

15. The telescoping stand of claim 12, wherein the first protrusion from the first bushing holds the first bushing in position between the inner tube and the outer tube, both axially down the outer tube and radially across the outer tube.

16. The telescoping stand of claim 12, wherein the second protrusion from the second bushing holds the second bushing in position between the outer tube and the leg fitting, both axially on the leg fitting and radially across the leg fitting.

17. The telescoping stand of claim 12, wherein the first protrusion from the first bushing holds the first indexed collar clamp in position over the outer tube, both axially down the outer tube and radially across the outer tube.

18. The telescoping stand of claim 12, wherein the second protrusion from the second bushing holds the second indexed collar clamp in position on the leg fitting, both axially on the leg fitting and radially across the leg fitting.

\* \* \* \* \*